(12) United States Patent
Wendt et al.

(10) Patent No.: US 11,870,655 B2
(45) Date of Patent: Jan. 9, 2024

(54) SYSTEM FOR PROVIDING A SEQUENCE OF NODES IN A NETWORK

(71) Applicant: SIGNIFY HOLDING B.V., Eindhoven (NL)

(72) Inventors: Matthias Wendt, Würselen (DE); Lennart Yseboodt, Retie (BE)

(73) Assignee: SIGNIFY HOLDING B.V., Eindhoven (NL)

( * ) Notice: Subject to any disclaimer, the term of this patent is extended or adjusted under 35 U.S.C. 154(b) by 299 days.

(21) Appl. No.: 17/287,595

(22) PCT Filed: Oct. 21, 2019

(86) PCT No.: PCT/EP2019/078530
§ 371 (c)(1),
(2) Date: Apr. 22, 2021

(87) PCT Pub. No.: WO2020/088968
PCT Pub. Date: May 7, 2020

(65) Prior Publication Data
US 2022/0116276 A1  Apr. 14, 2022

(30) Foreign Application Priority Data
Oct. 29, 2018 (EP) ..................... 18203109

(51) Int. Cl.
*H04L 41/12* (2022.01)
*H04L 12/40* (2006.01)

(52) U.S. Cl.
CPC ........ *H04L 41/12* (2013.01); *H04L 12/40013* (2013.01); *H04L 12/40045* (2013.01)

(58) Field of Classification Search
CPC ............... H04L 41/12; H04L 12/40013; H04L 12/40045
See application file for complete search history.

(56) References Cited

U.S. PATENT DOCUMENTS

| | | |
|---|---|---|
| 2014/0042913 A1 | 2/2014 | Yang et al. |
| 2014/0225512 A1 | 8/2014 | Birru et al. |
| 2019/0008017 A1* | 1/2019 | Modi ...................... H04L 67/60 |

FOREIGN PATENT DOCUMENTS

| | | |
|---|---|---|
| DE | 4038992 C1 | 2/1992 |
| DE | 19940700 A1 | 3/2001 |
| EP | 1455278 A1 | 9/2004 |
| WO | 02101401 A1 | 12/2002 |
| WO | 2016075683 A2 | 5/2016 |

* cited by examiner

*Primary Examiner* — Duc C Ho

(57) ABSTRACT

The present disclosure refers to a system for providing a sequence of nodes in a single pair network, like a PoDL network. The nodes of the network are connected in series by a single pair cable comprising two conductors, and the nodes comprise means for providing a short circuit to the two conductors. The system comprises a unit for sending a short circuit signal to a node causing the node to provide the short circuit, a unit for receiving a sequence determination signal from the node providing the short circuit, wherein the signal is indicative of a position of the node, and a unit for determining a sequence of a plurality of nodes based on the signals of the plurality of nodes. Accordingly, the system allows to determine the sequence accurately in an easy manner.

13 Claims, 3 Drawing Sheets

SYSTEM FOR PROVIDING A SEQUENCE OF NODES IN A NETWORK

CROSS-REFERENCE TO PRIOR APPLICATIONS

This application is the U.S. National Phase application under 35 U.S.C. § 371 of International Application No. PCT/EP2019/078530, filed on Oct. 21, 2019, which claims the benefit of European Patent Application No. 18203109.6, filed on Oct. 29, 2018. These applications are hereby incorporated by reference herein.

FIELD OF THE INVENTION

The invention relates to a system, a single pair network, a node adapted for being connected to a single pair network, a method and a computer program for providing a sequence of nodes in a single pair network.

BACKGROUND OF THE INVENTION

Today, single pair networks, like power over data line (PoDL) networks, are often used in applications in which a high number of nodes, for instance, nodes comprising luminaires, are connected with each other using a single cable, for instance, a single twisted pair cable. In such arrangements it would be advantageous to automatically provide a sequential address for each node connected by such a cable. Sequential addresses could then be used in commissioning groups for controlling the nodes in predetermined settings, for instance, predetermined lighting scene settings.

SUMMARY OF THE INVENTION

It is an object of the present invention to provide a system, a single pair network, a node adapted for being connected to a single pair network, a method and a computer program that allows for providing a sequence of nodes in a single pair network accurately in an easy manner.

In a first aspect of the present invention a system for providing a sequence of nodes in a single pair network is presented, wherein the nodes of the single pair network are connected in series by a single twisted pair Ethernet cable comprising two conductors, and wherein the nodes comprise short circuit providing means for providing a short circuit to the two conductors, wherein the system comprises a) a short circuit signal sending unit adapted to send a short circuit signal to a node causing the short circuit providing means of the node to provide the short circuit to the two conductors, b) a sequence determination signal receiving unit adapted to receive a sequence determination signal from the node providing the short circuit wherein the sequence determination signal is indicative of a position of the node along the cable, and c) a sequence determination unit adapted to determine a sequence of a plurality of nodes along the cable based on the sequence determination signals of the plurality of nodes.

Since the nodes comprise short circuit providing means for providing a short circuit to the two conductors and since the short circuit signal sending unit is adapted to send a short circuit signal to a node causing the short circuit signal providing means of the nodes to provide the short circuit, the short circuit provided by the node can be used to generate a signal, i.e. the sequence determination signal, that is indicative of a position of the node along the cable. Moreover, since the sequence determination signal receiving unit is adapted to receive the sequence determination signal, the sequence determination signal of a plurality of nodes can be used by the sequence determination unit to determine a sequence of the plurality of nodes along the cable. Furthermore, since the sequence is determined by causing a node to provide a short circuit it can be ensured that the sequence determination signal will be caused by the node providing the short and not, for instance, by some other node, such that the sequence can be determined accurately in an easy manner.

A plurality of nodes comprising short circuit providing means are preferably connected in series to the single twisted pair Ethernet cable belonging to a single pair network. Preferably, the single pair network is a PoDL network. Alternatively, the network can be, for instance, a 10 Mb/s single twisted pair Ethernet (10SPE) network or a reduced twisted pair gigabit Ethernet (RTPGE) network. The nodes can be, for instance, luminaires or sensors, like movement sensors. Moreover, the network can also comprise nodes that do not comprise short circuit providing means in addition to the nodes comprising the short circuit providing means, wherein in such an embodiment the sequence is only determined for the nodes comprising the short circuit providing means. The short circuit providing means of a node comprise preferably a switch for providing a direct connection, i.e. a short circuit, between the two conductors of the single twisted pair Ethernet cable. Alternatively, the short circuit providing means can comprise a relay contact, a transistor, a MOSFET, a transmission gate, a TRIAC, etc. for realizing the short circuit between the two conductors.

The short circuit signal sending unit of the system can be provided in one node, in a plurality of nodes or in all nodes connected to the single pair network. Moreover, in an embodiment, the short circuit signal sending unit can also be provided in a specialized sequence determination device for determining the sequence of the nodes in a single pair network, wherein this specialized sequence determination device can be connected to the network during the determination of the sequence and can afterwards be disconnected from the network. The short circuit signal can be any signal interpreted by the short circuit providing means in such a way that the short circuit providing means provide the short circuit to the two conductors, for instance, the short circuit signal can be an electrical signal that is sent along the Ethernet cable to a respective node or, if the short circuit signal sending unit is provided in the node that should provide the short circuit, the short circuit signal sending unit can send an electrical short circuit signal along electrical connections within the node to the short circuit providing means. Moreover, the short circuit signal sending unit might be adapted to send a short circuit signal wirelessly to the short circuit providing means, wherein in this case the short circuit providing means comprise receiving means for receiving the wireless short circuit signal.

The node providing the short circuit is adapted to provide a sequence determination signal indicative of a position of the node along the Ethernet cable. The sequence determination signal can be, for instance, a signal directly caused by the short circuit provided by the node, for instance, an electrical signal reflected by the short circuit. Alternatively, the signal can be a signal that is indirectly caused by the short circuit, for instance, a signal that is actively sent by the node, if during a short circuit an additional condition is met that is indicative for the position of the short circuit along the cable. The sequence determination signal receiving unit is then adapted to receive the sequence determination signal from a node providing the short circuit. The sequence determination signal receiving unit can also be provided in one node, in a plurality of nodes or all nodes connected to the single pair network. Moreover, the sequence determination signal receiving unit can be provided together with the short circuit signal sending unit in a node or can be provided in a node not comprising the short circuit signal sending unit. Further, the sequence determination signal receiving unit can also be provided in a specialized sequence determination device that can be connected to the single pair network during the sequence determination.

During a sequence determination process the short circuit signal sending unit can be adapted to send a short circuit signal to a plurality of nodes connected to the network and the sequence determination signal receiving unit is adapted to receive a sequence determination signal from each node of the plurality of nodes to which a short circuit signal has been sent. Alternatively, the short circuit signal sending unit is adapted to send the short circuit signal only to one node, for instance, the node comprising the short circuit signal sending unit, wherein in this case a plurality of short circuit signal sending units are provided and the sequence determination signal receiving unit is adapted to receive a sequence determination signal from each node to which one of the short circuit signal sending units has sent a short circuit signal.

The sequence determination unit is adapted to determine the sequence of the plurality of nodes for which a sequence determination signal has been received based on the sequence determination signals of all nodes providing a short circuit, i.e. sending a sequence determination signal. Since the sequence determination signal is indicative of the position of each node along the cable, the sequence of the plurality of nodes along the cable can be based on the position of each node of the plurality of nodes along the cable. Preferably, the sequence determination unit is provided in the same node or in nodes also comprising the sequence determination signal receiving unit. Moreover, the sequence determination unit can be provided together with the sequence determination signal receiving unit in a specialized sequence determination device that can be connected to the single pair network during a sequence determination process.

In an embodiment, the system further comprises a distance measurement signal providing unit adapted to provide a distance measurement signal to a node providing a short circuit, wherein the sequence determination signal corresponds to a reflection of the distance measurement signal by the short circuit.

The distance measurement signal can be any signal that allows to measure a reflection of the signal reflected by the short circuit provided by a node. Preferably, the distance measurement signal is an electrical signal comprising, for instance, a step function of a voltage or one or more pulses of a voltage applied to the network. In this embodiment, a reflection of the distance measurement signal corresponds to the sequence determination signal, such that the sequence determination signal receiving unit is adapted to receive as sequence determination signal the reflection of the distance measurement signal and such that the sequence determination unit is adapted to determine the sequence of the plurality of nodes based on reflections of the distance measurement signals as sequence determination signals of the plurality of nodes. Preferably, the sequence determination unit is further adapted to determine a time between a providing of the distance measurement signal and the receiving of the reflection of the distance measurement signal and to determine the sequence of the plurality of nodes along the cable based on the determined times for each of the plurality of nodes. Moreover, it is preferred that the sequence determination unit is adapted to use the distance measurement signal and the reflection of the distance measurement signal in a time domain reflectometry (TDR) measurement to determine a distance between a measurement signal providing unit and the node providing the short circuit. In this embodiment, the distance measurement signal providing unit is preferably provided in the same node as the sequence determination signal receiving unit receiving the sequence determination signal, i.e. the reflection of the distance measurement signal, such that the sequence determination unit determines the distance between the node providing the short circuit and the node providing the sequence determination signal receiving unit and the distance measurement signal providing unit. The sequence determination unit is then adapted to determine the sequence of the plurality of nodes along the cable based on the distances determined for each node of the plurality of nodes.

In an embodiment, the system further comprises a selection unit adapted to select a node to which the short circuit signal sending unit should send the short circuit signal. Preferably, the selection unit is further adapted to receive an identification signal for each node of a plurality of nodes and to select each node of the plurality of nodes one by one based on a numerical sequence of the identification signals, wherein each identification signal is indicative of the identity of one of the nodes of the plurality of nodes and comprises a numerical value. The identification signal in this embodiment can be any identification signal that unambiguously identifies the identity of the node to which the identification signal refers. For instance, the identification signal can be a MAC address of a node. In an additional or alternative preferred embodiment, the selection unit is further adapted to send an identification signal, wherein the identification signal is indicative of an identity of one of the nodes of the plurality of nodes that is intended to be selected, wherein the selection unit is adapted to select the node if, after a predetermined time period beginning with the sending of the identification signal, the selection unit does not receive another identification signal indicative of the identity of another node of the plurality of nodes. In this embodiment it is preferred that the selection unit is provided in each of the plurality of nodes and is adapted to send the identification signal of the node in which it is provided and to select this node if, after a predetermined waiting time period beginning with the sending of the identification signal, no other selection unit of one of the other nodes has sent an identification signal of the respective node. It is further preferred that in this embodiment the selection unit is adapted to randomize a time between an initialization of a sequence determination and the sending of the identification signal indicative of the node intended to be selected. Accordingly, the chance of receiving an identification signal of another node during the waiting time period is minimized.

In an embodiment, each node of the plurality of nodes comprises a short circuit signal sending unit, wherein after an initialization of a sequence determination the short circuit signal sending unit of each node of the plurality of nodes is adapted to send a short circuit signal to the node comprising the respective short circuit signal sending unit and to quit sending a short circuit signal after a predetermined time if the node comprising the short circuit signal sending unit has received a current during the short circuiting of the two conductors. In this embodiment no selection unit is necessary, since all nodes will provide a short circuit automatically after an initialization of the sequence determination process. In this case, only the node next to the current source, i.e. the first node, will receive current. Accordingly, if the sequence determination signal receiving unit receives the sequence determination signal, i.e. the reflection of the distance measurement signals from the node, the sequence determination signal is indicative of the position of this node with respect to the current source. When after a predetermined time the "first" node stops providing the short circuit, a node providing a short circuit being the next node in line with respect to the current source will receive a current and generate a sequence determination signal indicative of its position, i.e. the "second" position. Accordingly, in this embodiment the sequence determination unit can be adapted to determine the sequence of the plurality of nodes based on the sequence in which the sequence determination signal receiving unit has received the sequence determination signals from the plurality of nodes.

In an embodiment, the short circuiting means are adapted to provide a short circuit such that only high frequencies of the distance measurement signal are reflected. In this embodiment, preferably the short circuiting means are adapted such that during the providing of a short circuit a direct current (DC) can still flow through the node. Preferably, in this embodiment the short circuiting means comprise a capacitor connected in series with a switch for short circuiting the two conductors. This embodiment has the advantage that nodes along the cable behind the node providing the short circuit can still receive a current, for instance, a DC current, and can thus still provide a service in accordance with their function in the network during the sequence determination process. For instance, a movement sensor might still provide movement detection or an emergency light might still provide emergency illumination during the sequence determination process.

In an embodiment, each node of the plurality of nodes comprises a short circuit signal sending unit, wherein after an initialization of a sequence determination the short circuit signal sending unit of each node of the plurality of nodes is adapted to send a short circuit signal to the node comprising the respective short circuit signal sending unit and to quit sending a short circuit signal after a predetermined time if the node comprising the short circuit signal sending unit has received a current during the short circuiting of the two conductors, wherein a node receiving a current during the short circuiting of the two conductors is adapted to send an identification signal indicative of the identity of the node, wherein the sequence determination signal corresponds to the identification signal. In this case, no distance measurement signal providing unit is necessary, since the sequence determination unit can in this embodiment be adapted to determine the sequence of the plurality of nodes from the sequence of the received identification signals, i.e. from the sequence determination signals.

In an embodiment, the system further comprises a voltage measurement unit, wherein the voltage measurement unit is adapted to measure a voltage at a node of the plurality of nodes, wherein the sequence determination unit is adapted to further determine the sequence based on the measured voltage. Due to the resistance of the Ethernet cable depending mainly on the length of the cable, a measured voltage at a node will depend on the length of the cable between a current source and the node, and the applied current. If the same current is applied to all nodes, i.e. to the network, the measured voltage at a node only depends on the cable length and is therefore indicative of the position of the node along the cable. Accordingly, the sequence determination unit can additionally determine a sequence based on a voltage measured for each node of the plurality of nodes. In a preferred embodiment, the voltage measurements are used to verify the sequence determined based on the sequence determination signal as described, for instance, in one of the embodiments above. Moreover, in this embodiment, it is preferred that each node comprises a voltage measurement unit and is adapted to send a result of a voltage measurement by the voltage measurement unit to a sequence determination unit.

In an embodiment, the sequence determination unit is further adapted to receive an identification signal from the plurality of nodes and to determine the sequence of the plurality of nodes by sorting the identification signals of the plurality of nodes in accordance with the sequence of the nodes, wherein the identification signal is indicative of the identity of the node sending the identification signal. In this embodiment, the identification signal is preferably a MAC address of the respective node, such that the sequence determination unit is adapted to provide a list sorting the MAC addresses of the plurality of nodes provided in the single pair network in accordance with the sequence of the nodes along the cable. Further, it is preferred that the sequence determination unit is adapted to determine the sequence of the nodes along the Ethernet cable with respect to a current source, a predetermined node or an end of the Ethernet cable.

In a further aspect of the present invention a single pair network comprising a plurality of nodes connected in series by a single twisted pair Ethernet cable comprising two conductors, wherein the nodes comprise short circuit providing means for providing a short circuit to the two conductors, and a system in accordance with the above described embodiments is presented.

In a further aspect of the present invention a node adapted for being connected to a single pair network is presented, wherein the node comprises short circuit providing means for providing a short circuit to the two conductors of a single twisted pair Ethernet cable.

In a further aspect of the present invention a method for providing a sequence of nodes in a single pair network is presented, wherein the nodes of the single pair network are connected in series by a single twisted pair Ethernet cable comprising two conductors, and wherein the nodes comprise short circuit providing means for providing a short circuit to the two conductors, wherein the method comprises for a plurality of nodes a) sending a short circuit signal to a node causing the short circuit providing means of the node to provide the short circuit to the two conductors, b) receiving a sequence determination signal from the node providing the short circuit, wherein the sequence determination signal is indicative of a position of the node along the cable, and c) determining a sequence of the plurality of nodes along the cable based on the sequence determination signals of each of the plurality of nodes.

In a further aspect of the present invention a computer program for providing a sequence of nodes in a single pair network is presented, wherein the computer program comprises program code means for causing the system of claim 1 to carry out the steps of the method as defined in claim 14 when the computer program is run on a computer controlling the system.

It shall be understood that the system of claim 1, the network of claim 12, the node of claim 13, the method of claim 14 and the computer program of claim 15 have similar and/or identical preferred embodiments, in particular as defined in the dependent claims.

It shall be understood that a preferred embodiment of the present invention can also be any combination of the dependent claims or embodiments above with the respective independent claim.

These and other aspects of the invention will be apparent from and elucidated with reference to the embodiments described hereafter.

DETAILED DESCRIPTION OF EMBODIMENTS

Figure 1:
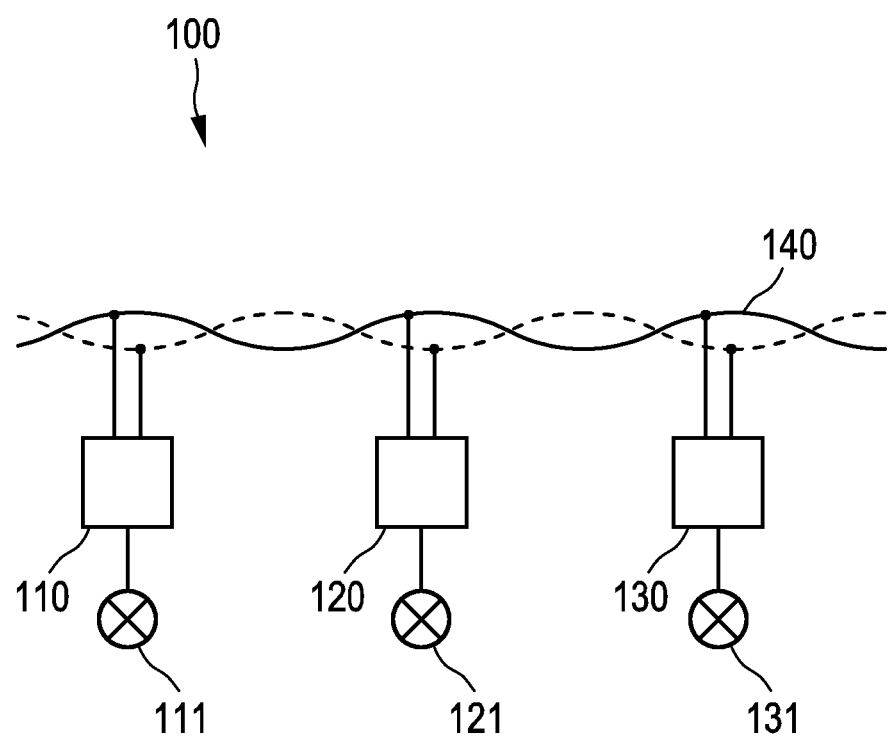
FIG. 1 shows schematically and exemplarily an embodiment of a known single pair network.
Figure 2:
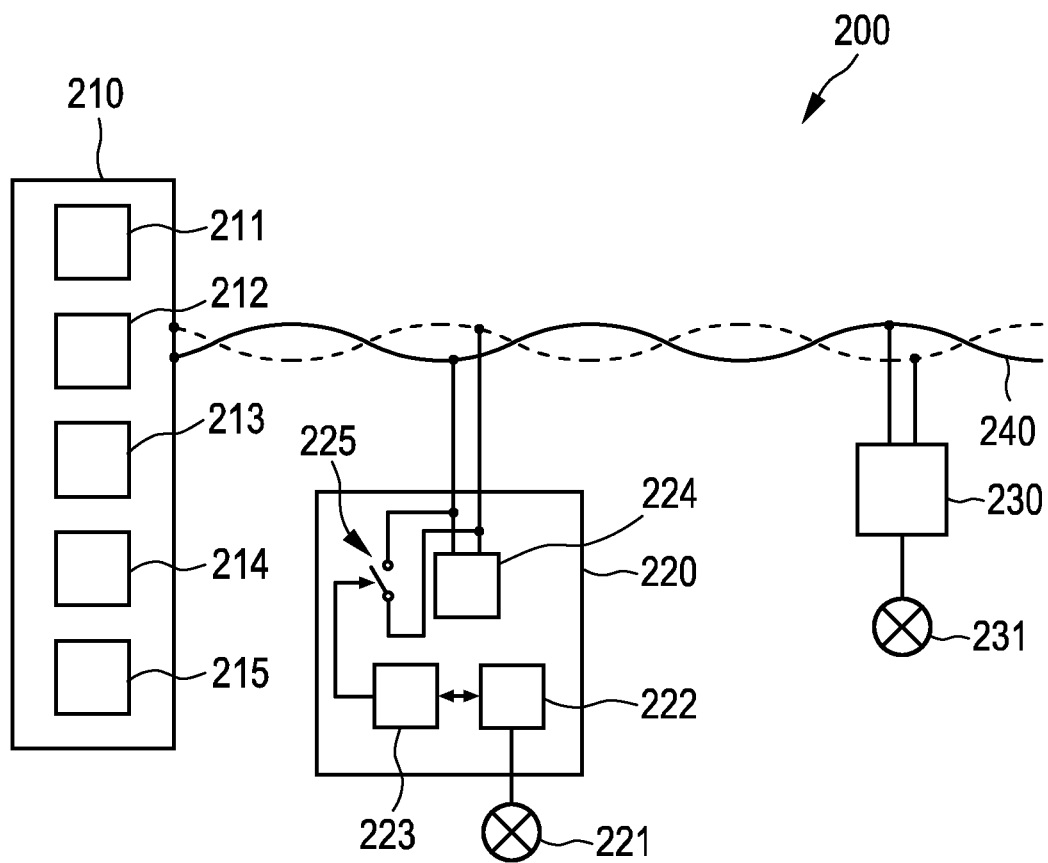
FIG. 2 shows schematically and exemplarily a single pair network comprising a system for providing a sequence of nodes in a single pair network.

FIG. 1 shows schematically and exemplarily an embodiment of a known single pair network. In this example the system 100 comprises a multidrop bus 140 using a single twisted pair cable for providing a connection between a plurality of nodes 110, 112, 130, each comprising a luminaire 111, 121, 131. In this exemplary embodiment only three nodes 110, 120, 130 are shown, but more nodes can be connected to the multidrop bus 140 on the left or on the right of the shown nodes 110, 120, 130. For such networks 100 comprising a plurality of nodes 110, 120, 130 it would be advantageous to provide a system that automatically determines the sequence of the nodes 110, 120, 130 along the multidrop bus 140. An exemplary embodiment of a system according to the invention for providing such a sequence of nodes is described in the following with respect to FIG. 2. FIG. 2 shows schematically and exemplarily a single pair network comprising a system for providing a sequence of nodes in the single pair network. In this exemplary embodiment the network is a PoDL network 200 comprising a single twisted pair Ethernet cable 240 to which nodes 220, 230 are connected, wherein in this embodiment the nodes 220, 230 are substantially constructed equally, wherein only the node 220 is shown in detail. Moreover, in this embodiment the network 200 comprises the system 210 for providing a sequence of the nodes 220, 230, wherein the system 210 is provided as part of a head node. The head node comprising the system 210 is selected for coordinating the sequence determination process.

In this embodiment, each node 220, 230 comprises a bus interface 224 comprising PHY and MAC functions and a lighting driving means 222 for driving a lighting unit 221, 231, respectively. Moreover, each node 220, 230 comprises short circuit providing means 223 comprising a switch 225 for short circuiting the two conductors of the cable 240.

In this exemplary embodiment system 210 provided in the head node comprises a short circuit signal sending unit 211, a selection unit 212, a distance measurement signal providing unit 213, a sequence determination signal receiving unit 214 and a sequence determination unit 215. After an initialization of the sequence determination process, each of the nodes 220, 230 sends an identification signal which can be a MAC address, indicating the identity of the node 220, 230 to the head node. The selecting unit 121 is adapted to receive the identification signals of the nodes 220, 230. If the identification signals comprise a numerical value, the selecting unit 212 can be adapted to select one of the nodes 220, 230 based on the numerical value of the identification signal. For instance, the selecting unit 212 could select the node with the smallest numerical value in the identification signal as the node to which a short circuit signal should be sent first, wherein a node with the next smallest numerical value in the identification signal is selected to provide a short circuit after the node selected first has provided the short circuit, etc.

According to the selection of the selection unit 212, the short circuit signal sending unit 211 sends a short circuit signal to the node 220 selected by the selection unit 212. A node 220 selected by the selection unit 212 then receives the short circuit signal provided by the short circuit signal sending unit 211 and the short circuit providing means 223 are then adapted to control the switch 225 such that a short circuit is provided to the two conductors of the single twisted pair cable 240 for a predetermined time. The predetermined time is determined to be long enough to detect which nodes 220, 230 are in the segment between the head node and short circuiting node or to execute a distance measurement. Preferably the predetermined time lies in a range between 1 s an 5 s. During the provision of the short circuit by the node 220, the distance measurement signal providing unit 213 is adapted to provide a distance measurement signal to the node 220. For instance, the distance measurement signal providing unit 213 can provide a voltage pulse to the node 220 along cable 240. Due to the short circuit provided to the two conductors of the cable 240, the voltage pulse will be reflected by the node 220 providing the short circuit and the reflection of the distance measurement signal can be measured by the sequence determination signal receiving unit 214.

The sequence determination unit 215 is in this embodiment adapted to perform a TDR measurement by determining the distance between the head node, i.e. system 210 provided in the head node, and node 220 based on the time between the sending of the distance measurement signal and the receiving of the reflection of the distance measurement signal, i.e. of the sequence determination signal. Further, the sequence determination unit 215 is adapted to determine the sequence of the nodes 220, 230 connected to the single twisted pair cable 240 based on the different distances measured for each node 220, 230. For instance, the sequence determination unit 215 can determine a sequence by providing a list of the identification signals, for instance, MAC addresses, of the nodes 220, 230 that are sorted in accordance with their distance to the head node.

Although in the above embodiment the single pair network is a PoDL network, the invention can also be used with other single pair networks, like 10SPE networks or RTPGE networks.

Although in the embodiment above the short circuit signal sending unit, the selection unit, the distance measurement signal providing unit, the sequence determination signal receiving unit and the sequence determination unit are provided in a head node, in another embodiment all or some of these units might be provided in all or some of the nodes connected to the single pair network. Moreover, the head node described in the embodiment above might also comprise the functions and units of a general node connected to the network, for instance, the head node might also comprise short circuit providing means, a bus interface and/or lighting controlling means, for controlling a lighting unit. Further, the units of the system for providing a sequence of nodes in a single pair network might also be provided in a specialized device that can be connected to the network during the determination of the sequence of the nodes.

Although in the embodiment above the selection unit is adapted to select the nodes that should provide a short circuit one by one based on a numerical value of the identification signal, in another embodiment the selection unit can also be adapted to select the nodes randomly. Moreover, if more than one selection unit is provided, for instance, if at least some nodes connected to the network comprise a selection unit, the selection units can send signals to each other for negotiating a node that should provide a short circuit next. In this case, the selection unit can be adapted to send an identification signal, for instance, a MAC address, of a node that should be selected next as broadcast to the network, i.e. to all other selection units. If the selection unit does not receive the identification signal of another node, for instance, sent by another selection unit, during a predetermined time, the selection unit is adapted to select the broadcasted node, wherein the short circuit signal sending unit will then send a short circuit signal to this node for short circuiting the two conductors of the Ethernet cable. The distance measurement signal providing unit and the sequence determination signal receiving unit can then provide the distance measurement signal and receive the reflection of the distance measurement signal, respectively, for this node. Accordingly, as in the embodiments described above, the sequence determination unit can then determine the distance from the sequence determination unit to the node.

Although in the above described embodiments the system comprises a selection unit, in other embodiments the selection unit can be omitted. For instance, in an embodiment, each of the plurality of nodes for which the sequence should be determined could comprise a short circuit signal sending unit, wherein each of these short circuit signal sending units is adapted to provide the short circuit signal only to the short circuiting means of the respective node to which the short circuit signal sending unit belongs. In such an embodiment, the short circuit signal sending units could be adapted to provide a short circuit signal simultaneously to all the nodes, respectively, when the sequence determination is initialized. In this case, the node next to a current source will receive a current and only for this node a distance can be determined according to the embodiments above. After a predetermined time, the node receiving the current will release the short circuit, i.e. the short circuit signal sending unit will quit sending a short circuit signal or will send a short circuit release signal such that the short circuit providing means release the short circuit, and the node next in line from the current source will now receive a current. In a related embodiment even the distant measurement signal providing unit can be omitted, wherein in this case the node receiving a current during the short circuiting of all nodes is adapted to send its identification signal, for instance, its MAC address, as sequence determination signal to the sequence determination signal receiving unit. In this case, a sequence determination unit will know, based on the sequence in which the sequence determination signals are received, in which sequence the nodes have received a current from the current source, such that the sequence determination unit can determine the sequence of the nodes in the network accordingly.

Although in the embodiments above nodes in line behind a short circuiting node will not be supplied with a current over the single pair network and thus cannot provide their function, for instance, light, in another embodiment the nodes can be provided with a local energy storage, like a battery. Accordingly, in this embodiment the function of the nodes can be ensured during the determination of the sequence. In a related embodiment the short circuit might be provided such that only high frequencies of a distance measurement signal get reflected, wherein a direct current can still flow through the network to the other nodes in line behind the short circuiting node. In this embodiment the nodes can be adapted to provide at least a part of their function when provided with the direct current. For realizing this embodiment the short circuiting means might comprise a capacitor in series connected with a switch.

Although in the embodiment above an absolute distance with respect to a head node comprising the distance measurement signal providing unit and the sequence determination signal receiving unit is determined, in another embodiment the sequence determination unit might also be adapted to determine, for instance, using a TDR method, a distance to an end of the Ethernet cable and to determine the distances of the individual nodes as fractions of the total length of the Ethernet cable.

Although in the embodiment above the sequence determination unit is adapted to determine the sequence based on a sequence determination signal being a reflection of a distance measurement signal or an identification signal, in other embodiments the sequence determination signal might be a different signal. Moreover, the sequence determination unit might be adapted to further determine a sequence of the plurality of nodes based on a voltage measured for each node. In this embodiment at least one node might comprise a voltage measurement unit that is adapted to measure a voltage during a time at which a node provides a short circuit, wherein the sequence determination unit is then adapted to determine the sequence of the plurality of nodes based on the voltage measured for each node providing a short circuit. In an alternative embodiment each node of the plurality of nodes comprises a voltage measurement unit and measures the voltage at the respective node without the necessity of providing a short circuit. In this case the nodes are adapted to send the respective measured voltage to the sequence determination unit, wherein the sequence determination unit is adapted to determine the sequence further based on the measured voltages of the nodes. Although in the embodiment above the nodes comprise lighting units, in other embodiments the nodes can comprise additionally or alternatively, for instance, sensors, user interfaces, ventilation systems, etc.

Although in the embodiment above the short circuit providing means comprise a switch, in other embodiment the short circuit providing means might comprise a relay contact, a transistor, a MOSFET, a transmission gate, a TRIAC, a solid state relay, etc.

Figure 3:
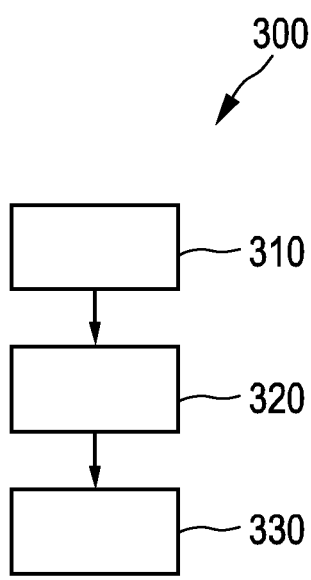
FIG. 3 shows a flowchart exemplarily illustrating an embodiment of a method for providing a sequence of nodes in a single pair network.

FIG. 3 shows a flowchart exemplarily illustrating an embodiment of a method for providing a sequence of nodes in a single pair network. The method 300 provides the following steps to a plurality of nodes. In a first step 310 the method comprises sending a short circuit signal to a node causing the short circuit providing means of the node to provide the short circuit to the two conductors. Since the node provides a short circuit to the two conductors, in a second step 230 a sequence determination signal can be received from the node providing the short circuit, wherein the sequence determination signal is indicative of a position of the node along the cable. After having executed the first step 310 and the second step 320 for a plurality of nodes, the method comprises in a third step 330 determining a sequence of the plurality of nodes along the cable based on the sequence determination signals of each of the plurality of nodes.

This invention relates, for instance, to connected lighting system where connectivity is realized by means of a multi-drop bus, like currently standardized in the IEEE 802.3 CG Standard called 10SPE. In such a lighting system a single pair cable in a communication bus is used to connect nodes, wherein multiple nodes directly connect to the signal pair cable. Since in such a system typically a high number of lighting nodes is connected to such a communication bus, it would be very beneficial if there were a method to automatically give the lighting nodes a sequential address. These sequential addresses can be used in commissioning groups of lights, i.e. lighting nodes, and provide scene settings. It is the intention of this invention to describe methods that allow the detection of the sequence of nodes on, for instance, 10SPE buses.

In one embodiment it is proposed to make use of the fact that 10SPE systems announce a head node of a multidrop segment of a single pair network. Accordingly, in such an embodiment means, i.e. a distance measurement signal providing unit, a sequence determination signal receiving unit and a sequence determination unit, can be provided in the head node to do cable distance measurements towards other network nodes by means of a TDR.

Reflectometry is frequently used to test the integrity of wires and cables. During a TDR measurement a step or pulse of voltage is sent down a wire, i.e. cable, and is reflected by any impedance discontinuity such as a break or short circuit in the wire. The reflected signal is then detected at a source of the signal. The delay between the incident and reflected signal indicates the distance to the discontinuity. From a magnitude and phase of the reflected signal also the type of the discontinuity can be estimated.

In one embodiment it is proposed to use short circuit providing means at each node to short circuit a bus wire, i.e. conductors of an Ethernet cable, temporarily and to compare all echo delay times, i.e. times after which a reflected signal from the short circuit is received. Further, it is proposed that by this comparison a head node can easily sort all the other nodes in sequence. The MAC addresses of all nodes can be used as means to distinguish between the nodes. In such an embodiment one node is considered to be a coordinating node, i.e. a head node. All other nodes allowing for distance measurements comprise a normal bus interface comprising PHY and MAC functions and further an additional device, i.e. a short circuit providing means, that can introduce a short circuit between the two conductors of the twisted pair cable. The short circuit providing means may comprise a relay contact, a transistor, a MOSFET, a transmission gate or TRIAC to provide the short circuit. Such a network node short circuits the two conductors of the twisted pair cable and the head node generates a TDR signal. Then, the head node measures the time delay until the reflection of the TDR signal is received. The echo measurement is yielding a relative measure for the distance between the head node and the node providing the short circuit.

In a preferred embodiment the head node firstly collects all MAC addresses of all nodes within the network attached to the head node on the bus, wherein in a TDR phase, i.e. during the sequence determination, the head node selects all other bus nodes one by one to execute the bus short circuiting. After all nodes have been measured separately, the distances can be sorted and a related address can be given, for instance, by means of a dedicated process for DHCP. Alternatively, the sorted list of nodes can go directly to a lighting control database supporting auto commissioning.

Also further embodiments are envisioned. For instance, in another embodiment the selection of nodes that should provide a short circuit may not require a knowledge of the MAC addresses, i.e. identification signal, of all nodes or a clear coordinating node, i.e. head node, but might happen randomly. For instance, the node deciding to short circuit can send out a packet, i.e. identification signal, via broadcast indicating its MAC address. For a short circuit duration, i.e. a predetermined time, the node listens whether another node also wants to short circuit, i.e. sends a packet indicating its MAC address. If this should be the case, the node waits before requesting a slot again, i.e. before again sending a packet indicating its MAC address. When no other node requested a slot in the waiting time, the node applies the short circuit for a fixed, i.e. also predetermined, time. All other nodes, also, for instance, a head node, can in this case try for a TDR distance measurement during the provision of the short circuit. The next node can only start requesting a slot for providing a short circuit after a fixed period has elapsed with respect to the previous short circuit. In order to reduce the chance for multiple nodes applying for a short circuit at the same time, the time between announcements, i.e. between the sending of an identification signal, might be randomized.

In another embodiment no selection of the short circuiting node happens. In this embodiment all nodes short circuit synchronously, wherein only the first node will see a current, for instance, due to a provided TDR impulse or due to PoDL currents, and knows that its distance will be determined first. This node releases the short circuit after a fixed period of time and in this case the next node will see a current and so forth. In a related embodiment no TDR measurement is required when all nodes short circuit the bus wire, i.e. Ethernet cable. In this case, the first node receiving a current is adapted to send back its MAC address, i.e. an identification signal, and then to open the short circuit such that the next node receives a current and so forth.

10SPE also specifies a bus power distribution, i.e. power over data line PoDL, wherein this distribution will be sacrificed when short circuiting the Ethernet cable of the bus and the bus powered nodes will not be supplied with current any more. Thus, in a further embodiment the nodes are provided with a local energy storage like a battery. This allows to use this method for fully bus supplied nodes like sensors, UIs or low power lighting devices.

In a further embodiment no real short circuits are used. In such an embodiment the short circuit may be provided in a way that only high frequencies get reflected and DC current can still flow. This may be provided by providing a capacitor in series with the switch for short circuiting the conductors of the Ethernet cable.

In a further embodiment the TDR measurement is also provided for the end of the cable and the distances of the nodes can be calculated as fractions of the total length of the cable. Such an embodiment might be helpful in track and trunk applications.

In an alternative embodiment a head node might not imply high frequency methods like TDR methods but might apply a DC loop resistance measurement by applying a fixed current and measuring the resulting voltage at the terminals of the head node. If at the same time a node is producing a short circuit down the line, the resulting measured voltage is a result of the cable DC resistance and might be used to determine the sequence of the nodes. In a related embodiment the nodes do not provide a short circuit but instead measure a DC voltage at their terminals and report the voltage measurements via a data link to a head node. In this case an order of the nodes, i.e. a sequence, might be determined from the voltage measurements, wherein a lower voltage refers to a node that is further away.

Other variations to the disclosed embodiments can be understood and effected by those skilled in the art and practicing the planned invention from the study of the drawings, the disclosure and the appendant claims.

In the claims, the word "comprising" does not exclude other elements or steps, and the indefinite article "a" or "an" does not exclude a plurality.

A single unit or device may fulfil the functions of several items recited in the claims. The mere fact that certain measures are recited in mutual different dependent claims does not indicate that a combination of these measures cannot be used to advantage.

Procedures like the sending of the short circuit signal, the receiving of a sequence determination signal or the determining of a sequence of the plurality of nodes performed by one or several units or devices can be performed by any other number of units or devices. The procedures and/or the operations of the system can be implemented as program code means of a computer program and/or as dedicated hardware. A computer program may be stored/distributed in a suitable medium, such as any optical storage medium or solid state medium, supplied together with or as part of other hardware, but might also be distributed in other forms, such as via the internet or other wired or wireless telecommunication systems.

Any reference signs in the claims should not be construed as limiting the scope.

The invention refers to a system for providing a sequence of nodes in a single pair network, like a PoDL network. The nodes of the network are connected in series by a single pair cable comprising two conductors, and the nodes comprise means for providing a short circuit to the two conductors. The system comprises a unit for sending a short circuit signal to a node causing the node to provide the short circuit, a unit for receiving a sequence determination signal from the node providing the short circuit, wherein the signal is indicative of a position of the node, and a unit for determining a sequence of a plurality of nodes based on the signals of the plurality of nodes. Accordingly, the system allows to determine the sequence accurately in an easy manner.

The invention claimed is:

1. A system for providing a sequence of nodes in a single pair network, wherein the nodes of the single pair network are connected in series by a single twisted pair Ethernet cable comprising two conductors, and wherein the nodes comprise short circuit providing means for providing a short circuit to the two conductors, wherein the system comprises:

a short circuit signal sending unit adapted to send a short circuit signal to a node causing the short circuit providing means of the node to provide the short circuit to the two conductors, a sequence determination signal receiving unit adapted to receive a sequence determination signal from the node providing the short circuit, wherein the sequence determination signal is indicative of a position of the node along the cable, a sequence determination unit adapted to determine a sequence of a plurality of nodes along the cable based on the sequence determination signals of the plurality of nodes, and a distance measurement signal providing unit adapted to provide a distance measurement signal to a node providing a short circuit, wherein the sequence determination signal corresponds to a reflection of the distance measurement signal by the short circuit.

2. The system according to claim 1, wherein the system further comprises a selection unit adapted to select a node to which the short circuit signal sending unit should send the short circuit signal.

3. The system according to claim 2, wherein the selection unit is further adapted to receive an identification signal for each node of a plurality of nodes and to select each node of the plurality of nodes one by one based on a numerical sequence of the identification signal, wherein each identification signal is indicative of the identity of one of the nodes of the plurality of nodes and comprises a numerical value.

4. The system according to claim 2, wherein the selection unit is further adapted to send an identification signal, wherein the identification signal is indicative of an identity of one of the nodes of the plurality of that is intended to be selected, wherein the selection unit is adapted to select the node, if after a predetermined time period beginning with the sending of the identification signal the selection unit does not receive another identification signal indicative of the identity of another node of the plurality of nodes.

5. The system according to claim 4, wherein the selection unit is adapted to randomize a time between an initialization of a sequence determination and the sending of the identification signal indicative of the node intended to be selected.

6. The system according to claim 1, wherein each node of the plurality of nodes comprises a short circuit signal sending unit, wherein after an initialization of a sequence determination the short circuit signal sending unit of each node of the plurality of nodes is adapted to send a short circuit signal to the node comprising the respective short circuit signal sending unit and to quit sending a short circuit signal after a predetermined time if the node comprising the short circuit signal sending unit has received a current during the short circuiting of the two conductors.

7. The system according to claim 1, wherein the short circuit providing means are adapted to provide a short circuit such that only high frequencies of the distance measurement signal are reflected.

8. The system according to claim 1, wherein each node of the plurality of nodes comprises a short circuit signal sending unit, wherein after an initialization of a sequence determination the short circuit signal sending unit of each node of the plurality of nodes is adapted to send a short circuit signal to the node comprising the respective short circuit signal sending unit and to quit sending a short circuit signal after a predetermined time if the node comprising the short circuit signal sending unit has received a current during the short circuiting of the two conductors, wherein a node receiving a current during the short circuiting of the two conductors is adapted to send an identification signal indicative of the identity of the node wherein the sequence determination signal corresponds to the identification signal.

9. The system according to claim 1, wherein the system further comprises a voltage measurement unit, wherein the voltage measurement unit is adapted to measure a voltage at a node of the plurality of nodes, wherein the sequence determination unit is adapted to further determine the sequence based on the measured voltage.

10. The system according to claim 1, wherein the sequence determination unit is further adapted to receive an identification signal from the plurality of nodes and to determine the sequence of the plurality of nodes by sorting the identification signals of the plurality of nodes in accordance with the sequence of the nodes, wherein the identification signal is indicative of the identity of the node sending the identification signal.

11. A single pair network comprising:
- a plurality of nodes connected in series by a single twisted pair Ethernet cable comprising two conductors, wherein the nodes comprise short circuit providing means for providing a short circuit to the two conductors, and
- a system according to claim 1.

12. A method for providing a sequence of nodes in a single pair network, wherein the nodes of the single pair network are connected in series by a single twisted pair Ethernet cable comprising two conductors, and wherein the nodes comprise short circuit providing means for providing a short circuit to the two conductors, wherein the method comprises for a plurality of nodes:

- sending a short circuit signal to a node causing the short circuit providing means of the node to provide the short circuit to the two conductors,
- receiving a sequence determination signal from the node providing the short circuit, wherein the sequence determination signal is indicative of a position of the node along the cable,
- determining a sequence of the plurality of nodes along the cable based on the sequence determination signals of each of the plurality of nodes, and
- providing a distance measurement signal to a node providing a short circuit, wherein the sequence determination signal corresponds to a reflection of the distance measurement signal by the short circuit.

13. A non-transitory computer readable medium storing instructions for providing a sequence of nodes in a single pair network, wherein the instructions when executed by one or more processors cause the one or more processors to perform the method as defined in claim 12.

* * * * *